(12) United States Patent
Yaman et al.

(10) Patent No.: US 9,146,359 B2
(45) Date of Patent: Sep. 29, 2015

(54) OPTICAL DISPERSION COMPENSATION MODULE USING FIBER BRAGG GRATING WITH MULTIPLE DEGREES OF FREEDOM FOR THE OPTICAL FIELD

(71) Applicant: NEC Laboratories America, Inc., Princeton, NJ (US)

(72) Inventors: Fatih Yaman, Monmouth Junction, NJ (US); Eduardo Mateo, Tokyo (JP); Lei Xu, Princeton Junction, NJ (US); Shaoliang Zhang, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 223 days.

(21) Appl. No.: 13/668,193

(22) Filed: Nov. 2, 2012

(65) Prior Publication Data

US 2013/0209035 A1 Aug. 15, 2013

Related U.S. Application Data

(60) Provisional application No. 61/554,737, filed on Nov. 2, 2011.

(51) Int. Cl.
*G02B 6/34* (2006.01)
*G02B 6/293* (2006.01)

(52) U.S. Cl.
CPC .............. *G02B 6/34* (2013.01); *G02B 6/29319* (2013.01); *G02B 6/29394* (2013.01)

(58) Field of Classification Search
None
See application file for complete search history.

(56) References Cited

U.S. PATENT DOCUMENTS 5,459,801 A * 10/1995 Snitzer ........................... 385/30
2002/0146226 A1 * 10/2002 Davis et al. ................... 385/126

\* cited by examiner

*Primary Examiner* — Sung Pak
(74) *Attorney, Agent, or Firm* — Joseph Kolodka

(57) ABSTRACT

Systems and methods are disclosed for enhancing optical communication by performing dispersion compensation in an optical fiber using a fiber Bragg grating (FBG); and providing increased degrees of freedoms (DOFs) to distinguish forward and backward propagating fields with a passive component.

20 Claims, 4 Drawing Sheets

OPTICAL DISPERSION COMPENSATION MODULE USING FIBER BRAGG GRATING WITH MULTIPLE DEGREES OF FREEDOM FOR THE OPTICAL FIELD

This application claims priority to U.S. Provisional Application Ser. No. 61/554,737 filed on Nov. 2, 2011, the content of which is incorporated by reference.

BACKGROUND

The present invention relates to Optical Dispersion Compensation.

One of the main sources of signal distortion in optical fibers is chromatic dispersion. Since dispersion has a linear process and affects the signal phase, it can be perfectly compensated without inducing any penalties. There are three main approaches to overcoming distortions due to fiber dispersion. First, reducing link dispersion, and second, compensating for dispersion effects at the coherent receiver or at the digital transmitter using digital signal processing.

The first approach can be implemented by designing fibers that have almost no dispersion, such as dispersion shifted fibers. However, it is well known if fiber dispersion is reduced, nonlinear impairments increase significantly. Since it is much more easy, and less expensive to compensate for fiber dispersion, than compensating nonlinear impairments, this method has been largely discarded by the community.

Another way to reduce link dispersion is concatenating different fibers in the link such that the dispersion of one fiber compensates totally or partially the dispersion of the other fiber. Such links are called compensated links. However, the fibers having negative dispersion has higher losses and higher nonlinearities. Moreover, since the dispersion of the link is periodically compensated, similar to the case of using low dispersion fibers, these links also have higher nonlinear penalties compared to using uncompensated links.

The second approach is to use uncompensated link with coherent transceivers, and compensate the accumulated dispersion at the transmitter side or at the receiver side using digital signal processing (DSP). The second approach has two problems. First, link dispersion can be very large, and current DSP technologies may not be adequate for compensating for the accumulated dispersion of transoceanic links. Second, compensation of dispersion by DSP requires very large amount of power consumption. Indeed, even in current receivers, majority of the power consumption is due to dispersion compensation.

The third approach attempts to compensate for the total dispersion of the entire link at the receiver side or at the transmitter side by optical methods. Basically, a passive optical component having the opposite of the accumulated dispersion of the entire link can be placed at the transmitter or at the receiver to fully compensate for the entire link dispersion. This is sometimes referred to as lumped dispersion compensation (400). In this case signal does not experience increased nonlinear penalty during transmission because fiber has large dispersion. However, so far there is no optical component that can compensate for the accumulated dispersion of an uncompensated link more than a few hundred kilometers meters long with acceptable insertion loss.

Since dispersion is a linear effect, in principle these components can be cascaded many times to achieve the amount of total dispersion that is required. However, because of the large insertion loss and also large PDL of these components, cascading them require using additional optical amplifiers which both increases system cost and reduces signal quality because of additional amplifier noise, and additional polarization-dependent loss.

FIG. 1 shows one approach where optical components use fiber Bragg grating (FBG) for dispersion compensation (100). Bragg gratings (BGs) can be written on many media, and when they are written on fibers they are called FBGs. FIG. 1 shows a simple schematic of how FBGs are typically used for dispersion compensation. The dispersed light enters from the left port of the circulator (101) and it is directed to the FBG (102). The short wavelengths have a higher group velocity, therefore they are ahead of the other wavelengths, and longer wavelengths are trailing. The BG is written with a chirp in the pitch, meaning that the pitch changes along the grating so that a phase matching condition is satisfied for longer wavelengths at the near side of the BG but not for the shorter wavelengths. Hence, the longer wavelengths are reflected from the nearside of the FBG. Similarly, the pitch is designed so that it satisfies the phase matching condition for shorter wavelengths at the far side of the BG. As a result, if the pitch and the chirp in the pitch is controlled well enough, the shorter wavelengths can be delayed with respect to the longer wavelengths by just the right amount so that the dispersion can be compensated.

There are two limitations to this method. First the largest dispersion amount that can be compensated depends on how long the FBG can be written, and the maximum length is currently limited to only a few meters due to the limitations of the FBG writing techniques. Second, FBG is reflective. Therefore it is necessary to use a circulator, which increases the insertion loss by at least 1.7 dB, because of the dual pass through the circulator. Indeed, the circulator is the major contributor to the insertion loss since the loss of a few meter long fiber can be ignored and writing FBG does not increase fiber loss appreciably. Assuming a maximum of a 1 m long FBG, the maximum amount of dispersion that can be compensated for is only 10000 ps, which is far less than 50000 to 150000 ps which is required for typical uncompensated transoceanic links. Cascading several FBGs can achieve the desired total amount of dispersion compensation at the cost of increased insertion loss.

SUMMARY

Systems and methods are disclosed for enhancing optical communication by performing dispersion compensation in an optical fiber using a fiber Bragg grating (FBG); and providing increased degrees of freedoms (DOFs) to distinguish forward and backward propagating fields with a passive component.

Implementations of the above aspect can include one or more of the following. The DOFs include a number of spatial modes. The system can provide multiple cores of a fiber with forward and backward travelling fields are placed on different cores of the fiber and they can be distinguished based on the core that they occupy. Different fibers can be joined by directional couplers, wherein forward and backward travelling fields are placed on different predetermined fibers and distinguished based on the predetermined fiber. No circulator is used with the FBG. The FBG can be written on multi-mode fibers or on few-mode fibers (FMFs). The FBG converts a forward travelling optical field traveling in the same direction from one mode to another mode. The FBG converts a forward travelling optical field traveling in an opposite direction to a different mode. The FBG converts a forward travelling optical field traveling in an opposite direction to leave the optical field in the same spatial mode but reflected in an opposite direction.

Advantages of the above aspect may include one or more of the following. The system attempts to compensate for the total link dispersion without increasing link loss, nonlinear penalties and without using digital signal processing at the transceiver which increases power consumption of the transceivers significantly. The system also attempts to achieve dispersion compensation using low cost materials with low insertion loss, low polarization-dependent loss (PDL), compact packaging, improved insensitivity to environment and higher power handling capability. The system achieves high performance due to reduced insertion loss and no PDL. The system can compensate larger amount of dispersion for a given length of fiber. The system has less complexity because it is an all fiber device that does not require the use of circulators. The system uses less components, and therefore easier for packaging, and for assembly. Lower cost because it has less components, and easier to package, and it has a small form factor. The system achieves higher operational range, since it does not use circulator, and it is a fiber only device, it can handle much larger optical power. The insertion loss of FBG based dispersion compensator is reduced significantly, as the present invention does not require circulator which is the main source of insertion loss. The PDL of the FBG based dispersion compensator is reduced significantly as the present invention does not require circulator which is the main source of polarization-dependent loss. The maximum amount of dispersion compensation achievable by a given length of fiber is reduced significantly by making use of multiple spatial modes, and the possibility of superimposing multiple BGs on the same stretch of fiber. The maximum amount of dispersion compensation achievable by a given length of fiber is reduced significantly by making use of multiple spatial modes, but using less number of BGs than the number of spatial modes used, by engineering the modal propagation constants of the fiber. The maximum amount of dispersion compensation achievable by a given length of fiber is reduced significantly by making use of multiple spatial modes, but using less number of BGs than the number of spatial modes used, by making use of the spatial symmetry of the modes. The packaging size is reduced because the device does not require the use of circulator and because of the shorter length of fiber required to compensate a given amount of dispersion. The device is less complex because it does not require any additional component than fiber. The device has increased tolerance for optical power since it does not require the use of circulator which limits the maximum amount of power that can be handled by the device.

DETAILED DESCRIPTION

Figure 1:
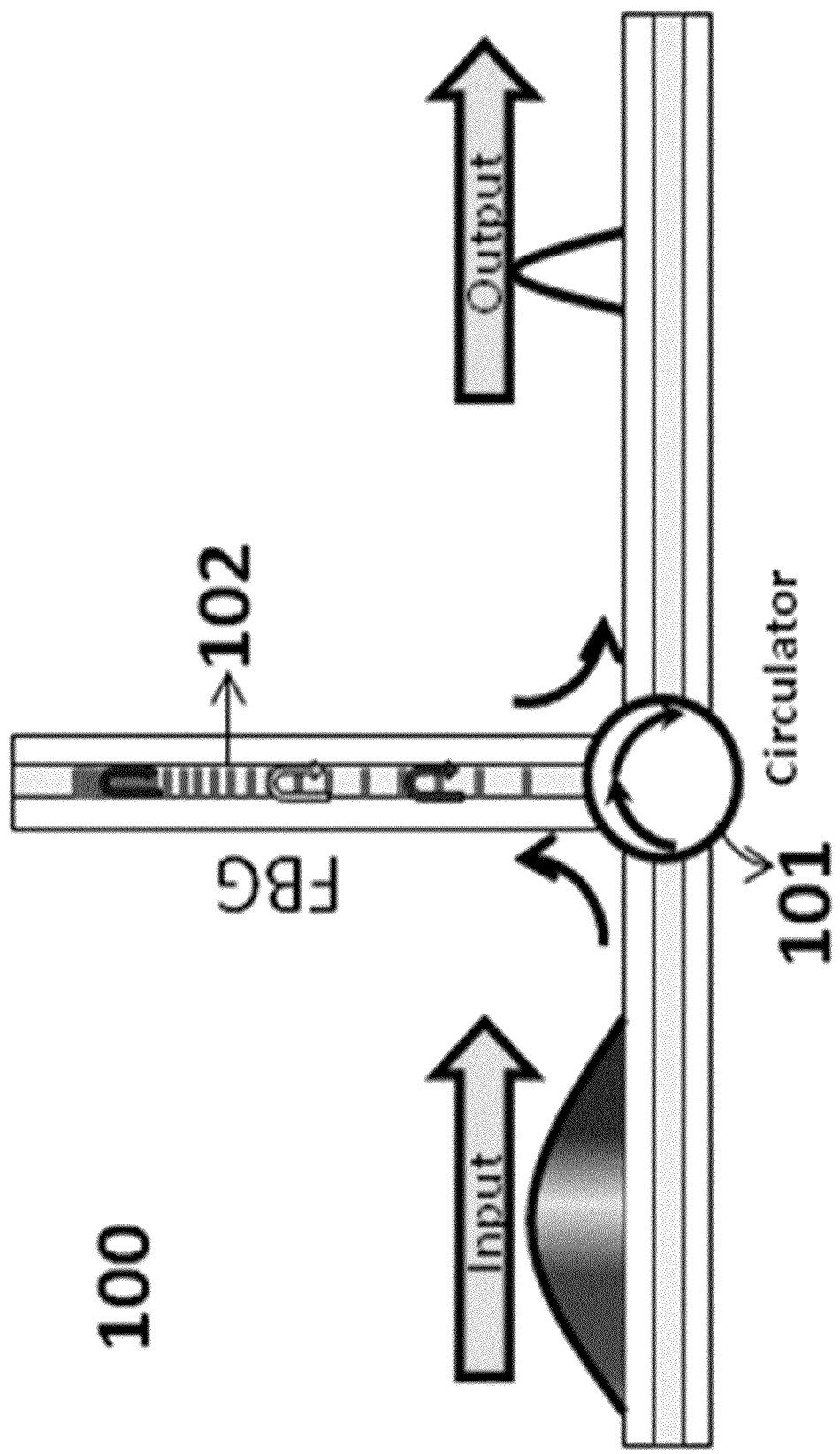
FIG. 1 shows a simple schematic of how FBGs are typically used for dispersion compensation.
Figure 2:
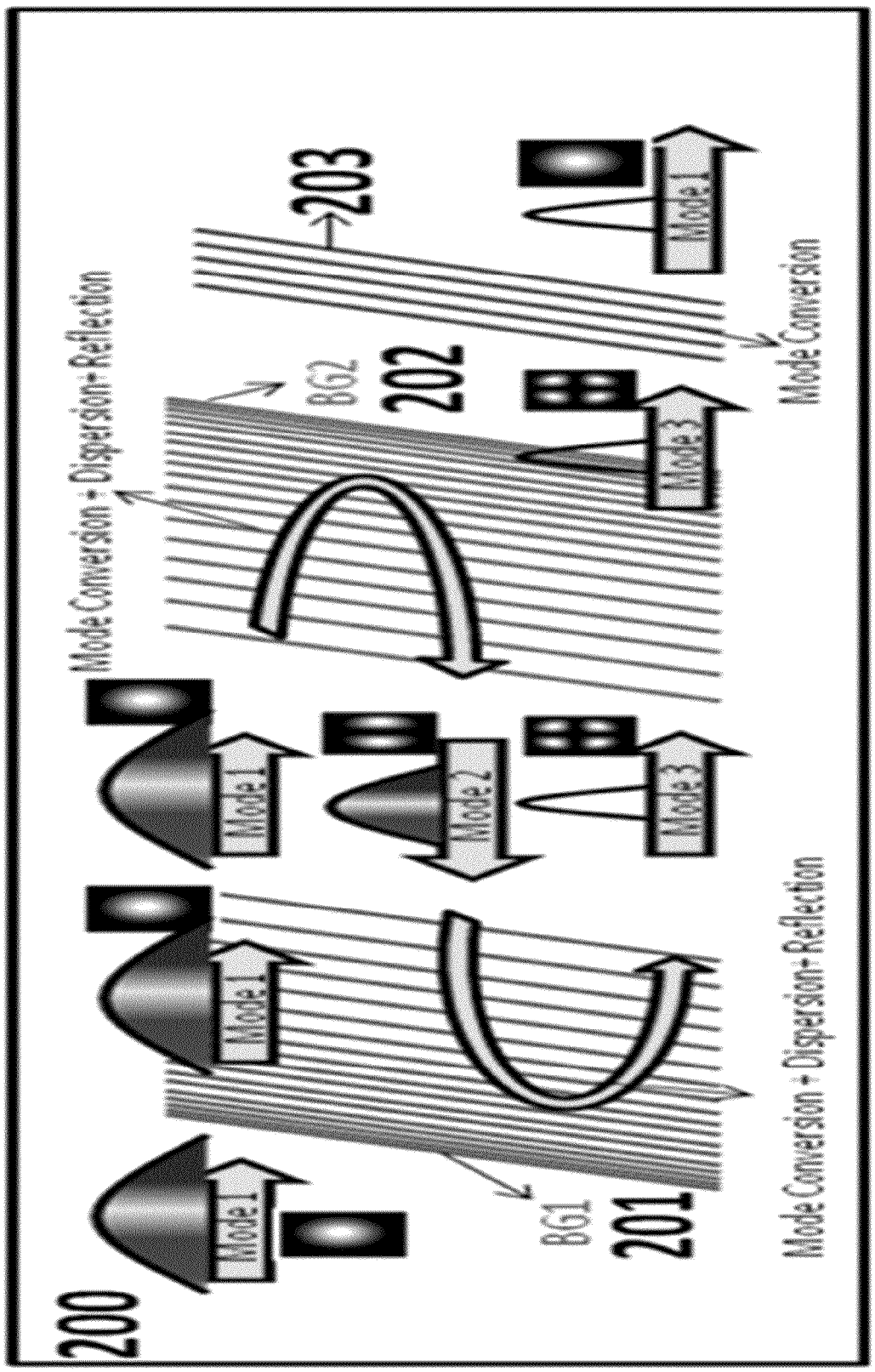
FIG. 2 shows a first embodiment of an Optical Dispersion Compensation Module Using Fiber Bragg Grating with Additional Multiple Degrees of Freedom for the Optical Field.

FIG. 2 shows a device with an Optical Dispersion Compensation Module Using Fiber Bragg Grating With Additional Multiple Degrees of Freedom For the Optical Field. The device consists of a FMF (200), the rectangle surrounding the figure, with three consecutive Bragg gratings (BGs) (201, 202, 203). Optical field that will experience dispersion compensation is launched to the FMF from the left side, and it leaces the fiber from the right end after proper dispersion compensation.

Initially the field is launched from the left side and it is only coupled to the mode 1, for instance to the fundamental mode. The field propagates unchanged until the BG2 (202). This is guaranteed by making sure that BG1(201) is written with grating period such that it does not phase match any frequency component of mode 1 to any mode supported by the fiber, or the cladding, or the radiation modes. In other words, if $k_1$ is the wavenumber of the BG1, $k_1 \neq \beta_1 - \beta_n$ for any possible $\beta_n$, where $\beta_1$ is the propagation constant of mode 1.

After passing through the BG1 unchanged, field arrives at BG2 which is designed so that it satisfies the phase matching condition between forward propagating mode 1 to backward propagating mode 2. Also, BG2 is chirped so that, different frequency components of the field is reflected and mode converted at different locations along BG2 depending on the desired dispersion. As a result, after BG2 mode 1 is reflected back, converted into mode 2 and experiences dispersion.

After BG2, field travels back to BG1 where it is reflected forward, and converted to mode 3 and also experiences dispersion by the desired amount, at the same time. Mode 3 passes through BG2 unchanged and without loss because BG2 does not satisfy phase-matching between any confined or unconfined fiber mode and mode 3.

After BG2, if desired, an additional mode convertor can be used to convert mode 3 back to mode 1. This is typically the case where the field entering the device and leaving the device would have the same spatial mode, but it is not necessary for the dispersion compensation. If this is the case, an additional BG (203) can be used to convert mode 3 back to mode 1 but leaves it propagating in the forward direction.

The difference between the propagation constants of forward propagating mode 1 and backward propagating mode 2 should be different than the difference between the propagation constants of any possible mode and mode 1, 2 or 3. Similarly, the difference in the propagation constants of backward propagating mode 2 and forward propagating mode 3 should be different than the difference between the propagation constants of any possible mode and mode 1, 2, or 3. In other words, $k_2 = (|\beta_1| + |\beta_3|) \neq |\beta_j \pm \beta_m|$, for any pair of j and m that includes j=1,2,3 and any m other than obviously the pair j=1, and m=3. Fiber should also be designed so that, $k_3 = (|\beta_2|) \neq |\beta_j \pm \beta_m|$ for any pair of j and m that includes j=1,2,3 and any m other than pair j=2, and m=3. Here $\pm \beta_m$ corresponds to the propagation constant of the $m^{th}$ mode travelling in the forward or backward direction, respectively, and $k_m$ corresponds to the wave-vector of the $m^{th}$ BG. The FBGs are designed to operate over a given frequency range. It is assumed that the above conditions are satisfied for all the frequencies in the given range. These conditions can be easily satisfied for many types of standard multimode fibers (408) but especially for FMFs (407), because the differences in the propagation constants of different modes in FMFs are significantly larger compared to multimode fibers. Therefore it is easier to design these fibers so that it is possible to write many different BGs with different phase matching conditions that do not overlap for a large frequency range. FIG. 2 gives the example of using only 3 modes, but this can be generalized so that many more modes can be utilized to add more and more dispersion compensation. An example of how this device can be generalized is given in FIG. 3 which shows a multi-mode embodiment.

Figure 3:
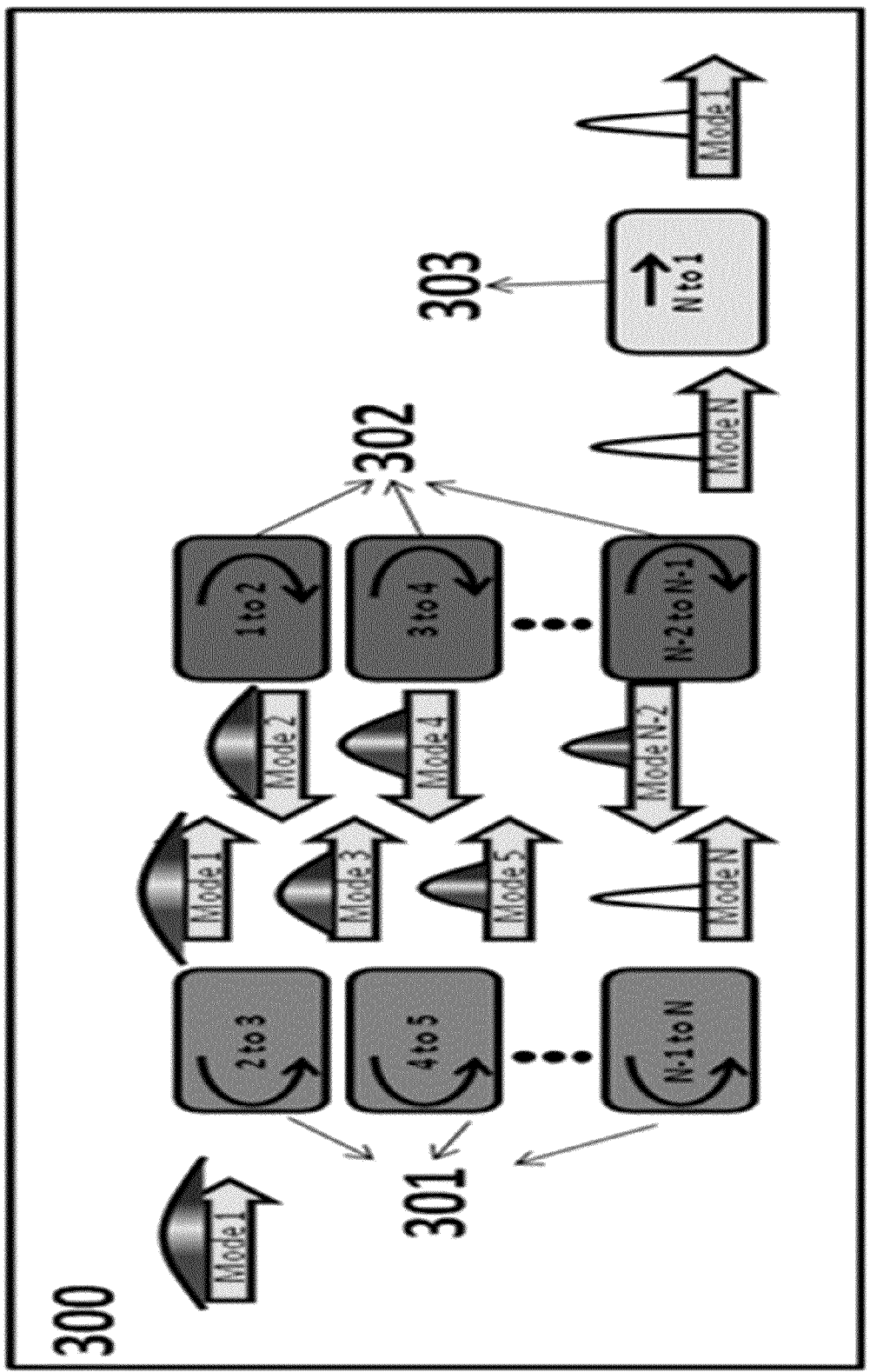
FIG. 3 shows a multi-mode embodiment.

In FIG. 3, boxes (303) represent BGs that convert one mode to the other but does not change the propagation direction. Boxes (301) and (302) represent BGs that simultaneously convert one mode to the other, invert the direction of propagation, i.e., reflect, and also impart dispersion. The only difference between the boxes 301 and 302 is the location, i.e., one is at the near side of the fiber and the other is at the back side. Even though the boxes are drawn in separate locations, and modes are separated for clarity, the BGs 301 can be super-imposed, and the BGs 302 can also be super imposed. The BGs shown in the red and blue boxes cannot overlap. The BG shown by 303 can overlap with the BGs 302 but not with the BGs 303. Being able to super impose these BGs (410) has the advantage that using a short piece of fiber, the amount of dispersion that can be compensated grows with the number of spatial modes (406) that are used.

In one embodiment, BGs 301 and the BGs 302 satisfy additional phase matching conditions. None of the BGs 301 should satisfy a phase matching between any of the modes travelling in the backward direction and any possible mode of the fiber except for the particular modes that it is coupling. In other words, for the grating with the grating wave-number $k_{23}$, i.e. blue grating 301 that converts mode 2 to mode 3, the fiber should be designed so that $k_{23}=(|\beta_2|+|\beta_3|)\neq|\beta_j\pm\beta_m|$, for any pair of j and m that includes j=2,4,6 ..., N−1 and any m other than the intended pair of j=2, and m=3. The conditions for other blue gratings 301 can be found by replacing, 2 and 3 by the appropriate pairs such as 4 and 5, 6 and 7 etc. Similarly, none of the BGs 302 on the right should satisfy phase-matching condition between any of the forward travelling mode and any possible mode except the particular modes that it is intended to convert. In other words, for the grating with the grating wave-number $k_{12}$ that converts mode 1 to 2, the fiber should be designed so that $k_{12}=(|\beta_1|+|\beta_2|)\neq|\beta_j\pm\beta_m|$, for any pair of j and m that includes j=1,3, 5, ..., N and any m other than the intended pair of j=1, and m=2. The conditions for other red gratings 302 on the right can be found by replacing, 1 and 2 by the appropriate pairs such as 3 and 4, 5 and 6 etc. Finally the BG that converts mode N back to mode 1 on the right most part of the fiber (box 303) should satisfy the phase matching condition $k_{N1}=||\beta_N|-|\beta_1||$.

The above conditions implies that if one uses N modes, and use 1 BG per mode, one can achieve (N−1)/2 times more dispersion compensation using the same length of fiber, because, the conversion from mode N back to mode 1 does not contribute to dispersion compensation, and the BGs 301 and 302 cannot overlap requiring them to utilize half the fiber length (410).

Ideally, an indefinite number of BGs can be super-imposed (410), since the impulse response of the BGs is linear. However, as N BGs are superimposed at the same location, the maximum peak-to-valley deviations in the refractive index perturbation also increases linearly with N. In practice, the maximum amount of perturbation achievable in refractive index is limited. Therefore, the number of BGs that can be superimposed is limited, and therefore the number of additional modes that can be utilized is limited. Therefore, the maximum amount of dispersion that can be compensated by a given length of FBG is limited.

One embodiment avoids this limitation by relaxing the above conditions for the propagation constants of different modes. The conditions given above are sufficient but not necessary depending on the fiber design. Note that, the same red BG can be used to convert mode 1 to mode 2, and mode 3 to mode 4, at the same time if the fiber can be designed so that the difference in the propagation constants of these pairs are equal (411). In other words, $k_{12}=(|\beta_1|+|\beta_2|)=(|\beta_3|+|\beta_4|)$. In this case, one BG can be avoided without sacrificing from the total amount of dispersion compensation. In the extreme case, it is possible to use as many modes as possible by using a total of only one red BG one blue BG and one mode convertor at the right side as long as the fiber modes satisfy the following conditions (411); $k_{12}=(|\beta_1|+|\beta_2|)=(|\beta_3|+|\beta_4|)=\ldots=(|\beta_{N-2}|+|\beta_{N-1}|)$ and for the blue BGs $k_{23}=(|\beta_2|+|\beta_3|)=(|\beta_4|+|\beta_5|)=\ldots=(|\beta_{N-1}|+|\beta_N|)$, but $(|\beta_1|+|\beta_2|)\neq(|\beta_2|+|\beta_3|)$, and also $||\beta_N|-|\beta_1||\neq(|\beta_2|+|\beta_3|)$.

Another embodiment relaxes the conditions that the fiber modes need to satisfy (412) is that making use of the fact that if both of the pair of coupled modes are symmetric, or both asymmetric, a grating with a refractive index profile perpendicular to the fiber core is the most efficient way to couple them. If one of them is symmetric and the other is asymmetric, a grating with a tilted index profile is the most efficient way to couple them. Such gratings are also known as blazed gratings (412). For instance, instead of requiring two mode pairs to satisfy the condition $(|\beta_1|+|\beta_2|)\neq(|\beta_2|+\beta_3|)$, it is possible to let them $(|\beta_1|+|\beta_2|)=(|\beta_3|+|\beta_4|)$ as long as one and only one of the 4 modes in this equation has a different spatial symmetry than the other three. In this case, the different mode pairs can be manipulated separately based on their spatial symmetries and not on their propagation constant differences.

Even though the above descriptions are based on using different spatial modes of multimode (408) and few-mode fibers (407) as additional degrees of freedom, it is clear that other degrees of freedoms can be utilized instead of spatial modes or together with spatial modes. For instance, it is possible to reflect the field into a different fiber core together with dispersion compensation if the fiber has multiple cores (404). It is also possible to reflect it back to a separate fiber by using fiber couplers along with gratings or other passive non-reciprocal components (405). However, using spatial modes is the most practical method as all the fields propagate in the same fiber core which makes it easier to write gratings, and also fields retain their coherence better (406).

FBG are obtained by generating perturbations in the refractive index profile of the fiber. These perturbations can cause mode coupling between different modes of the fiber. Here the fiber modes are used in the most general definition which includes all the modes confined to the core, that are confined in the cladding, those that are leaky, that are not confined by the fiber such as radiation modes, and also modes that travel in the forward or backward direction. In the simplest case, these perturbations are written on along the fiber with a very well controlled periodicity, which can couple a forward propagating mode, to a backward propagating mode, which is just reflection of the mode. FBGs can also couple one spatial mode of the fiber to the other. These modes can travel in the same direction or in the reverse direction [2]. The mode coupling depends on two conditions, one the two modes have non-zero overlap, and second they need to satisfy the phase-matching condition, given by $$k(z)=\beta_1(\omega)-\beta_2(\omega) \quad (1)$$

where $k(z)=2\pi/\Lambda(z)$ is the local grating wave number, $\Lambda$ is the local pitch of the perturbation, $\beta_1$ and $\beta_2$ are the propagation constants of the coupled modes, which can take negative value for backward propagating modes.

In current FBGs used for dispersion compensation, single-mode fiber (SMF) is used (402), which means, the fiber core supports propagation of only one spatial mode, which can propagate either in the forward or backward direction. The forward propagating field and the backward propagating fields occupy the same spatial mode, same polarization modes, and same stretch of fiber. The only difference is that one is propagating in the forward direction and the other in the backward direction. For this component to work, it is necessary to include a component that will allow the forward propagating field to pass through but reflect the backward propagating field coming back from the grating. The only passive components that can distinguish backward and forward propagating fields that otherwise occupy the same spatial mode, same polarization, and same space are called non-reciprocal components. The non-reciprocal components of choice are the circulators (102). However, using circulators significantly increase the insertion loss, causes PDL, increases costs, and complicates packaging.

In one embodiment, the system increases the degree of freedoms (DOFs) (403) such as the number of modes (406) so that we can place the forward and backward propagating field in different DOFs such as different spatial modes, and use a simpler, linear, passive, and reciprocal devices that can guide the forward and backward propagating fields in the same or different directions without increasing insertion loss significantly, causing PDL, among others. Another example of possible DOFs that can be used is multiple cores of a fiber (404). In this case forward and backward travelling fields can be placed on different cores of the fiber and they can be distinguished based on the core that they occupy. Another example of possible DOFs that can be used is using different fibers joined by directional couplers (405). In this case the forward and backward travelling fields can be placed on different fibers and they can be distinguished based on the fiber that they travel in.

The system solves the problem of high insertion loss, by avoiding the use of circulator (403) which is the main source of insertion loss, and PDL by using devices that provide additional DOFs for the propagating field. In one of the possible implementations of the current invention the FBG is written on multi-mode fibers (406), in particular on few-mode fibers (FMFs) (407). Another advantage of using FMFs (407) compared to multimode fibers (408) is that they suffer less from unwanted modal couplings compared to multimode fibers.

Current dispersion compensating FBGs are written on single-mode fibers (402). These fibers support propagation of light in only a single-spatial mode. Multimode fibers on the other hand support propagation of optical field in multiple spatial modes. FMFs are a subset of multimode fibers such that they support only a few modes, typically less than 10, sometimes less than 50, as opposed to multimode fibers which support very large number of modes.

FBGs are passive devices; therefore they cannot differentiate a forward propagating field from a backward propagating field. If multimode fibers are used for FBGs, a distinction can be made between forward and backward travelling fields by making sure that they are in different spatial modes. This gives an additional degree of freedom to design FBGs which can make it possible to avoid using circulators.

One embodiment uses shorter lengths of fiber to achieve the same amount of total dispersion compensation. It is possible to write FBGs that will affect a particular spatial mode and not others. Moreover, the FBGs that affect different spatial modes can be superimposed on the same stretch of fiber (410). Once the field is launched into the device, it can reflect back and forth, each time travelling in a different spatial mode, and each time accumulating dispersion from the FBG written for that particular mode until it is passed to the final spatial mode which is not reflected back and allowed to leave the device.

Another embodiment uses FBGs to convert a forward travelling optical field from one mode to another mode also traveling in the same direction, or to convert it to a different mode travelling in the opposite direction, or leave it in the same spatial mode but reflect in the opposite direction.

Long multimode fibers suffer from mode mixing. However, mode mixing is very small for fiber lengths that would be used for FBGs. It was recently shown that in FMFs (407) mode mixing is as low as −18 dB after 40 km, which would make it as low as 64 dB for a 1-meter-long fiber [4], which is sufficiently low enough to be neglected. The system of FIG. 4 achieves the following:

(1) Making use of additional degrees of freedom (DOF) to avoid using circulators, and also increase the amount of dispersion compensation per a given fiber length.

(2) Such DOFs can be as follows; different spatial modes of multimode fibers, different cores of a multi-core fiber, or different fibers joined by directional coupler.

(3) Using FMFs as opposed to the standard multimode fibers because the propagation constants of the modes of FMF have much better separation which makes it possible to use more modes for compensation. Also FMFs suffer less from unwanted mode mixing compared to standard multimode fibers.

(4) Using single BG to do mode conversion and dispersion compensation and reflection of different mode pairs to reduce the number of required BGs to take advantage of multiple modes, by using fibers with appropriate mode properties.

(5) Making use of the spatial symmetries of modes to relax the conditions that different mode pairs need to satisfy, so that more modes can be used.

Figure 4:
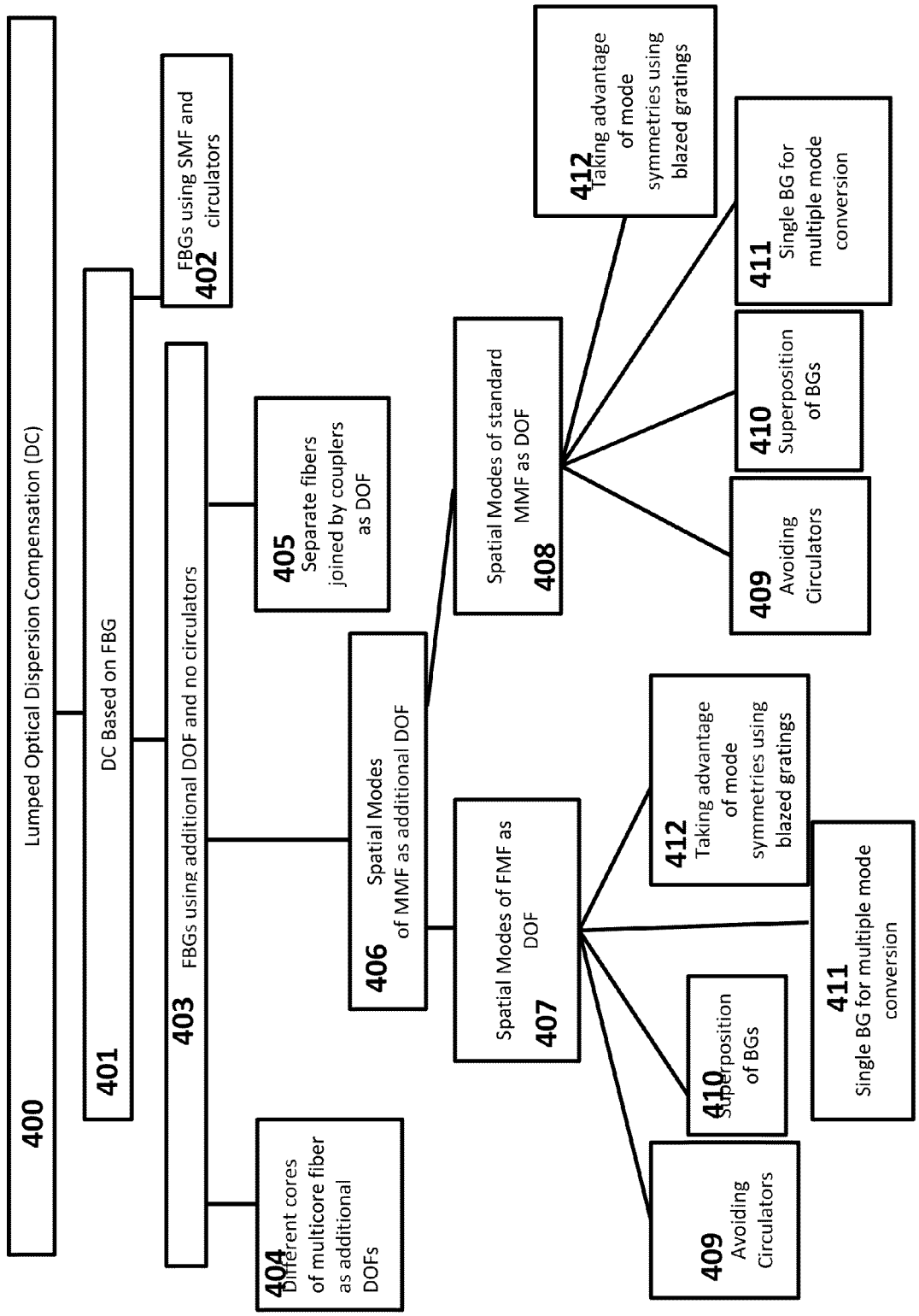
FIG. 4 shows a lumped optical dispersion compensation system.

The system of FIG. 4 has much better performance, because:

1. It has reduced insertion loss.
2. It does not have PDL.
3. It can compensate larger amount of dispersion for a given length of fiber.
4. It has less complexity because it is an all fiber device that does not require the use of circulators.
5. It has less components, and therefore easier for packaging, and for assembly.
6. Lower cost because it has less components, and easier to package, and it has a small form factor.
7. Higher operational range, since it does not use circulator, and it is a fiber only device, it can handle much larger optical power.

The system attempts to compensate for the total link dispersion without increasing link loss, nonlinear penalties and without using digital signal processing at the transceiver which increases power consumption of the transceivers significantly. The system also attempts to achieve dispersion compensation using low cost materials with low insertion loss, low polarization-dependent loss (PDL), compact packaging, improved insensitivity to environment and higher power handling capability. The system achieves high performance due to reduced insertion loss and no PDL. The system can compensate larger amount of dispersion for a given length of fiber. The system has less complexity because it is an all fiber device that does not require the use of circulators. The system uses less components, and therefore easier for packaging, and for assembly. Lower cost because it has less components, and easier to package, and it has a small form factor. The system achieves higher operational range, since it does not use circulator, and it is a fiber only device, it can handle much larger optical power. The insertion loss of FBG based dispersion compensator is reduced significantly, as the present invention does not require circulator which is the main source of insertion loss. The PDL of the FBG based dispersion compensator is reduced significantly as the present invention does not require circulator which is the main source of polarization-dependent loss. The maximum amount of dispersion compensation achievable by a given length of fiber is reduced significantly by making use of multiple spatial modes, and the possibility of superimposing multiple BGs on the same stretch of fiber. The maximum amount of dispersion compensation achievable by a given length of fiber is reduced significantly by making use of multiple spatial modes, but using less number of BGs than the number of spatial modes used, by engineering the modal propagation constants of the fiber. The maximum amount of dispersion compensation achievable by a given length of fiber is reduced significantly by making use of multiple spatial modes, but using less number of BGs than the number of spatial modes used, by making use of the spatial symmetry of the modes. The packaging size is reduced because the device does not require the use of circulator and because of the shorter length of fiber required to compensate a given amount of dispersion. The device is less complex because it does not require any additional component than fiber. The device has increased tolerance for optical power since it does not require the use of circulator which limits the maximum amount of power that can be handled by the device.

An optical network incorporating the optical dispersion compensation apparatus and methods described can more readily accommodate time-varying traffic patterns, data rates, or other network parameters as well as different standard data rates and foreign optical wavelengths. Bandwidth is more efficiently used throughout the network and the need for transponder regeneration is reduced. Utilization of the described methods and apparatus can be used to eliminate optical dispersion, such as chromatic dispersion, as a network design restriction or other engineering parameter. Accordingly, overall network design, deployment, maintenance, and operation are simplified.

Methods and apparatus for providing dispersion compensation have been described. Various modifications and changes may be made thereto without departing from the broader scope of the invention as set forth in the claims. The specification and drawings are, accordingly, to be regarded in an illustrative rather than a restrictive sense.

What is claimed is:

1. A method for optical communication, comprising:
performing dispersion compensation in an optical fiber using a fiber Bragg grating (FBG); and
providing increased degrees of freedoms (DOFs) to distinguish forward and backward propagating fields with a passive component; and
mode coupling based on whether two coupling modes have a non-zero overlap and phase-matched as $k(z)=\beta_1(\omega)-\beta_2(\omega)$ where $k(z)=2\pi/\Lambda(z)$ is a local grating wave number, $\Lambda$ is a local pitch of the perturbation, $\beta_1$ and $\beta_2$ are propagation constants of coupled modes.

2. The method of claim 1, wherein the DOFs include a number of modes.

3. The method of claim 1, comprising providing multiple cores of a fiber with forward and backward travelling fields are placed on different cores of the fiber and they can be distinguished based on the core that they occupy.

4. The method of claim 1, comprising providing different fibers joined by directional couplers, wherein forward and backward travelling fields are placed on different predetermined fibers and distinguished based on the predetermined fiber.

5. The method of claim 1, wherein zero circulator is used with the FBG.

6. The method of claim 1, wherein the FBG is written on multi-mode fibers.

7. The method of claim 1, wherein the FBG is written on few-mode fibers (FMFs).

8. The method of claim 1, wherein the FBG converts a forward travelling optical field traveling in the same direction from one mode to another mode.

9. The method of claim 1, wherein the FBG converts a forward travelling optical field traveling in an opposite direction to a different mode.

10. The method of claim 1, wherein the FBG converts a forward travelling optical field traveling in an opposite direction to leave the optical field in the same spatial mode but reflected in an opposite direction.

11. A communication system, comprising:
one or more optical fibers; and
means for writing a fiber Bragg grating (FBG) with dispersion compensation through increased degrees of freedoms (DOFs) to distinguish forward and backward propagating fields; and
mode coupling means based on whether two coupling modes have a non-zero overlap and phase-matched as $k(z)=\beta_1(\omega)-\beta_2(\omega)$ where $k(z)=2\pi/\Lambda(z)$ is a local grating wave number, $\Lambda$ is a local pitch of the perturbation, $\beta_1$ and $\beta_2$ are propagation constants of coupled modes.

12. The system of claim 11, wherein the DOFs include a number of spatial modes.

13. The system of claim 11, wherein the DOFs include multiple cores of a fiber with forward and backward travelling fields are placed on different cores of the fiber and they can be distinguished based on the core that they occupy.

14. The system of claim 11, wherein the DOFs use different fibers joined by directional couplers, wherein forward and backward travelling fields are placed on different predetermined fibers and distinguished based on the predetermined fiber.

15. The system of claim 11, wherein the FBG is written without a circulator.

16. The system of claim 11, wherein the FBG is written on multi-mode fibers.

17. The system of claim 11, wherein the FBG is written on few-mode fibers (FMFs).

18. The system of claim 11, wherein the FBG writing converts a forward travelling optical field traveling in the same direction from one mode to another mode.

19. The system of claim 11, wherein the FBG writing converts a forward travelling optical field traveling in an opposite direction to a different mode.

20. The system of claim 11, wherein the FBG writing converts a forward travelling optical field traveling in an opposite direction to leave the optical field in the same spatial mode but reflected in an opposite direction.

* * * * *